(12) United States Patent
Aufranc et al.

(10) Patent No.: US 7,954,954 B2
(45) Date of Patent: Jun. 7, 2011

(54) SYSTEM AND METHOD OF PROJECTING AN IMAGE USING A PLURALITY OF PROJECTORS

(75) Inventors: Richard Aufranc, Albany, OR (US); Thomas M. Carrico, Corvallis, OR (US); Olan C. Way, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 928 days.

(21) Appl. No.: 11/831,837

(22) Filed: Jul. 31, 2007

(65) Prior Publication Data

US 2009/0033874 A1 Feb. 5, 2009

(51) Int. Cl.
*G03B 21/14* (2006.01)

(52) U.S. Cl. ............. 353/30; 353/94; 353/121; 345/634

(58) Field of Classification Search ............ 353/94, 353/48, 71, 30, 121; 348/745; 345/745, 345/634
See application file for complete search history.

(56) References Cited

U.S. PATENT DOCUMENTS

| | | | | |
|---|---|---|---|---|
| 5,988,817 | A * | 11/1999 | Mizushima et al. | 353/94 |
| 6,222,593 | B1 * | 4/2001 | Higurashi et al. | 348/745 |
| 6,456,339 | B1 * | 9/2002 | Surati et al. | 348/745 |
| 6,513,938 | B2 * | 2/2003 | Kubota et al. | 353/94 |
| 6,561,651 | B1 * | 5/2003 | Kubota et al. | 353/30 |
| 6,637,887 | B2 * | 10/2003 | Yamanaka | 353/94 |
| 6,663,244 | B1 * | 12/2003 | Wichner et al. | 353/122 |
| 6,733,138 | B2 * | 5/2004 | Raskar | 353/94 |
| 6,793,350 | B1 * | 9/2004 | Raskar et al. | 353/121 |
| 6,814,448 | B2 * | 11/2004 | Ioka | 353/69 |
| 7,019,713 | B2 * | 3/2006 | Hereld et al. | 345/1.1 |
| 7,686,457 | B2 * | 3/2010 | Kobayashi et al. | 353/94 |
| 2005/0117126 | A1 * | 6/2005 | Miyazawa et al. | 353/94 |
| 2005/0195373 | A1 * | 9/2005 | Feigel et al. | 353/94 |
| 2005/0206857 | A1 * | 9/2005 | Yamada | 353/94 |
| 2006/0181685 | A1 * | 8/2006 | Hasegawa | 353/69 |
| 2007/0052934 | A1 * | 3/2007 | Widdowson et al. | 353/94 |
| 2007/0211225 | A1 * | 9/2007 | Kondo et al. | 353/94 |
| 2007/0291184 | A1 * | 12/2007 | Harville et al. | 348/745 |
| 2007/0291185 | A1 * | 12/2007 | Gelb et al. | 348/745 |
| 2008/0002160 | A1 * | 1/2008 | Chang et al. | 353/94 |
| 2008/0143969 | A1 * | 6/2008 | Aufranc et al. | 353/30 |
| 2008/0143978 | A1 * | 6/2008 | Damera-Venkata et al. | 353/94 |
| 2008/0266321 | A1 * | 10/2008 | Aufranc et al. | 345/626 |
| 2009/0027304 | A1 * | 1/2009 | Aufranc et al. | 345/1.3 |
| 2009/0033874 | A1 * | 2/2009 | Aufranc et al. | 353/30 |
| 2009/0091623 | A1 * | 4/2009 | Krogstad | 348/189 |

* cited by examiner

*Primary Examiner* — John R Lee

(57) ABSTRACT

A device and method is provided for projecting an image within a defined content area using a plurality of projectors configured to each project a portion of an image. The device comprises a defined content area into which the image is projected by the plurality of projectors. A first group of projectors can be selected from the plurality of projectors and set at a first zoom level, then aligned and superpositioned with respect to one another to increase the pixel resolution and brightness of the projected image. The projectors can project a majority of projector light within the content area. A second group of projectors can be selected from the plurality of projectors, set at a second zoom level, aligned and superpositioned adjacent each other to project a majority of projector light within the content area. The first group of projectors can be superimposed with the second group of projectors to fill the content area and increase the pixel resolution and brightness of the projected image.

15 Claims, 5 Drawing Sheets

SYSTEM AND METHOD OF PROJECTING AN IMAGE USING A PLURALITY OF PROJECTORS

BACKGROUND

A device for displaying an image, such as a display, projector, or other imaging system, produces a displayed image by addressing an array of individual picture elements or pixels arranged in horizontal rows and vertical columns. A resolution of the displayed image is defined as the number of horizontal rows by vertical columns of individual pixels forming the displayed image. The maximum possible resolution of a displayable image is affected primarily by the resolution of the display device itself. While the resolution of the image data processed by the display device is affected by the image resolution used to produce the displayed image.

Typically, to increase the overall resolution of the displayed image, the resolution of the display device as well as the resolution of the image data used to produce the displayed image is increased. Increasing the resolution of the display device generally increases the cost and complexity of the display device. This is particularly true of projection type devices. As the resolution of projection devices increases, the cost of the optical and lighting systems also increases dramatically, which increases the final cost of the projector system. If a bright projection image is desired for theater type of applications, then a significant cost can be incurred for a very high resolution lighting and projection system.

It is desirable to be able to enhance the display of projected images, including natural images and high contrast images (e.g. business graphics). In addition, being able to increase brightness and image size in an image projection system while keeping the cost down is valuable in the competitive electronics marketplace.

DETAILED DESCRIPTION

Figure 1:
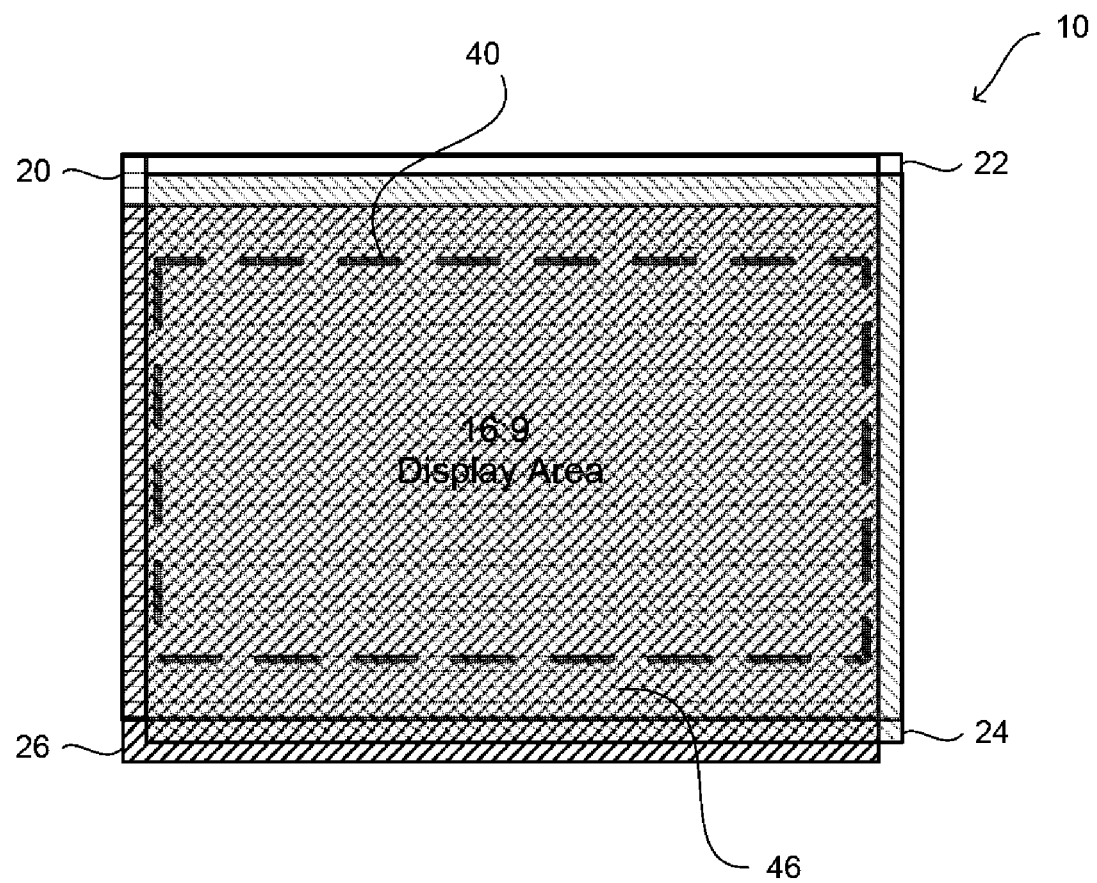
FIG. 1 illustrates a plurality of projectors overlapped to display an image within a defined content area according to a prior art method.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Some display systems, such as some image projectors, may not have sufficient resolution to display desired high resolution images. Such systems can be configured to give the appearance to the human eye of higher resolution images by displaying spatially shifted lower resolution images that are combined together to make a higher resolution image. The lower resolution images are referred to as sub-frames. One problem in sub-frame generation, which is addressed by embodiments described herein, is to determine how to combine values for the sub-frames so that the displayed sub-frames are close in appearance and intensity to the high-resolution image from which the sub-frames were derived.

With reference to FIG. 1, a plurality of projectors 10 are configured to project an image within a defined content area 40 according to a method known in the prior art. Specifically, FIG. 1 illustrates four 4:3 ratio projectors 20-26 projecting an image onto a defined content area 40, the defined content area having a 16:9 aspect ratio. Each projector comprising the plurality of projectors 10 projects a portion of the same image within the content area 40. The configuration of the plurality of projectors 10 can function to increase the brightness of the projected image and provide redundancy. Also shown in FIG. 1 is a significant amount of wasted light 46 near on a display area, which is shown as the light falling outside the content area. It should also be noted that the pixel resolution of the projected image is limited to a resolution equal with or less than the highest pixel resolution of one of the projectors comprising the plurality of projectors, which is not an effective use of projector capabilities.

Figure 2A:
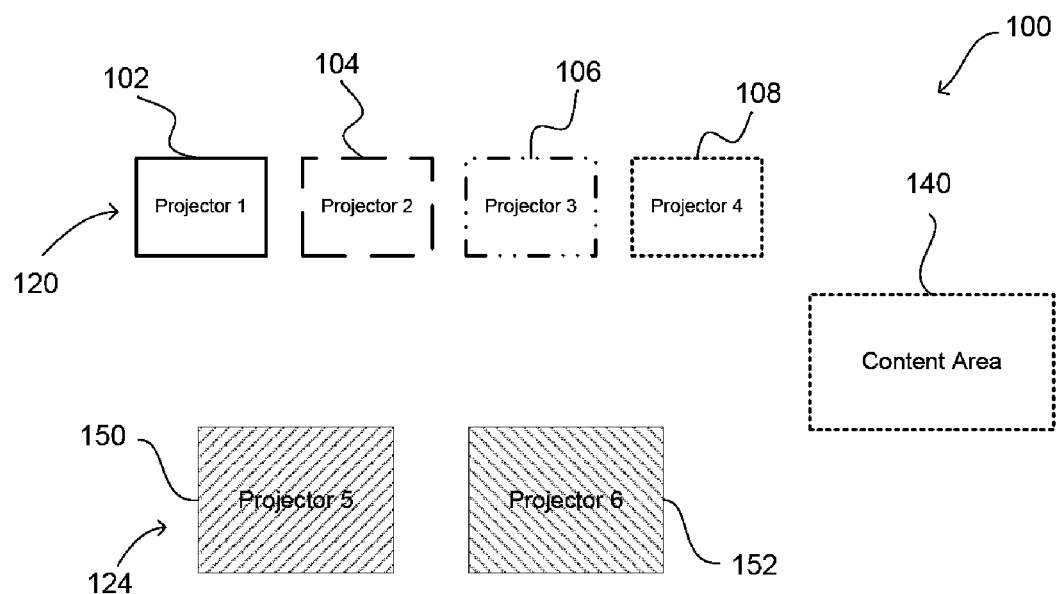
FIG. 2a illustrates an embodiment of a system for projecting an image, comprising a plurality of separate projectors and a content area defining the area within which the image will be projected.

Referring now to FIG. 2a, a system is shown for projecting an image. The system 100 includes a plurality of projectors configured to each project a portion of an image within a defined content area 140. The system 100 for projecting an image is designed such that the image to be projected is produced within the defined content area 140 when the plurality of projectors are aligned and superpositioned relative to each other, as shown in FIG. 2b.

The system for projecting an image can include a first group of projectors 120, selected from among the plurality of projectors, shown in FIG. 2a as comprising projectors 102-108. Each projector of the first group of projectors 120 can have a first aspect ratio and be set at a first zoom level such that the images projected by each of the separate projectors 102-108 of the first group of projectors 120 are substantially equivalent in size and shape when projected the same distance. The system for projecting an image 100 can also include a second group of projectors 124, also selected from among the plurality of projectors, shown as 150 and 152. Each projector of the second group of projectors 124 can have a second aspect ratio and be set at a second zoom level such that the images projected by each of separate projectors 150 and 152 of the second group of projectors 124 are substantially equivalent in size and shape when projected the same distance.

Figure 2B:
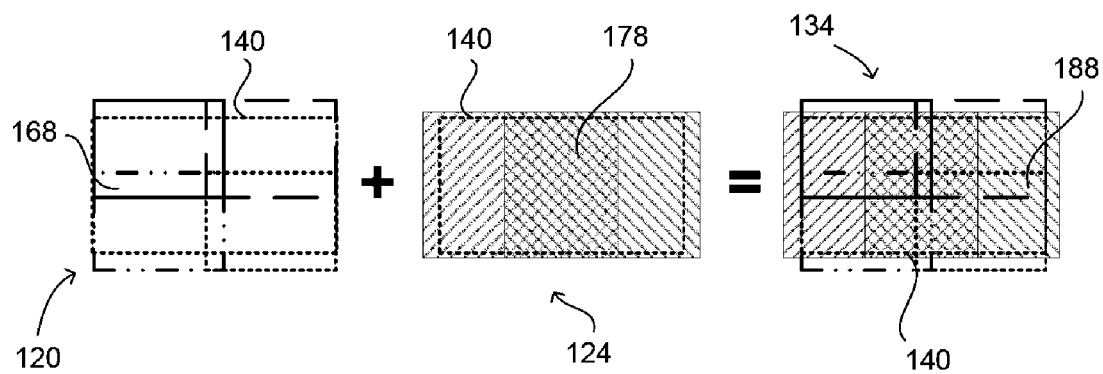
FIG. 2b is a schematic showing the plurality of separate projectors of FIG. 2a being aligned and superpositioned to project an image within the content area in an embodiment.

Referring now to FIG. 2*b*, the system 100 can project an image using projectors that are aligned and superpositioned relative to one another to display an image within the defined content area 140. To facilitate in displaying the image within the defined content area 140, the system may operate with software designed to divide the image into a plurality of portions and to communicate a portion of the image to a corresponding projector in a manner such that the totality of projected images merge and constitute the whole of the image.

The first group of projectors 120 may be aligned and superpositioned in a manner to contain a majority of the projector light within the defined content area 140 while allowing the overall projected area to be greater than the projected area of any one projector. The aligning and superpositioning of the first group of projectors 120 functions to increase the pixel resolution and brightness of an image in the projected area and thus allows a higher resolution image to be displayed by combining a plurality of lower resolution images output by the separate projectors. The pixel resolution, brightness, and projected area are dependent on the number of projectors used and, thus, can be increased or decreased by increasing or decreasing the number of projectors utilized. The alignment and superpositioning of the separate projectors may create overlap 168 (shown as the area between the borders defining the projected images) between the images displayed by the separate projectors.

The amount of overlap 168 is dependent on the positioning of the separate projectors and the number of projectors used. To minimize image distortion in the overlapping regions 168, the first group of projectors 120 may be configured to operate with a software system for blending the images (not shown). The system for blending, adjusting, and configuring the superimposed and superpositioned images may include a camera (not shown) and software. The camera and software can be designed to receive a visual input from the camera about the projected images and to control the output of the separate projectors so that adjacent projectors display substantially the same image in an overlapping region 168. The configuration of the camera, software, and system of projectors may be operably designed so that the software is capable of automatically adjusting the projected images vertically and horizontally in a self aligning manner until the camera receives a visual input indicating that substantially the same image is being projected in the overlapping regions. In this manner, a single continuous and uninterrupted image may be projected in the defined content area 140 in a manner that is visually pleasing to the viewer and that is a combination of the separately projected images. Configuring the first group of projectors 120 in this manner thus allows a higher resolution and brighter image to be displayed by using a combination of lower resolution images.

In a similar manner, the second group of projectors 124 may be aligned and superpositioned to contain a majority of the projector light within the defined content area 140 while allowing the overall projected area, pixel resolution, and brightness to be greater than the respective projected area, pixel resolution, and brightness of any one projector of the second group of projectors 124. Similarly, the projected area, pixel resolution, and brightness may be controlled by increasing or decreasing the number of projectors utilized in the second group of projectors 124. Overlap 178 (shown as the area encompassed by the combination of cross hatchings) between the projected images may also be created in the alignment and superpositioning of the second group of projectors 124. Furthermore, the second group of projectors 124 may be designed to operate with the software and camera system for image correction, comprising a camera and software, designed to control the output of the separate projectors so that adjacent projectors display substantially the same image in an overlapping region 178. As a result, a single continuous and uninterrupted image may be projected in the defined content area 140 in a manner that is visually pleasing to the viewer and that is a combination of the images of the separate projectors. The arrangement of the second group of projectors also permits a higher resolution and brighter image to be displayed by using a combination of images from lower resolution projectors.

The projected image of the first group of projectors may be superimposed with the projected image of the second group of projectors providing redundancy and forming an image 134 within the defined content area 140 having a pixel resolution and brightness greater than the pixel resolution and brightness of any one of the separate projectors. The combination of the projected images results in a significant amount of overlap 188 (shown as the area enclosed in the defined content area) that may be controlled by an image correction system comprising a camera and software in a manner similar to that previously presented. Superimposing the projected images permits a system for projecting an image to utilize inexpensive lower resolution projectors to project an image having a pixel resolution comparable to expensive higher resolution projectors and having brightness equal to or greater than expensive higher resolution projectors. Superimposing the projected images also permits the system to provide redundancy, thus ensuring the image against a failure of any one of the separate projectors and permits a user to control the resolution and brightness of the overall system by controlling the number of projectors in the system.

Figure 3A:
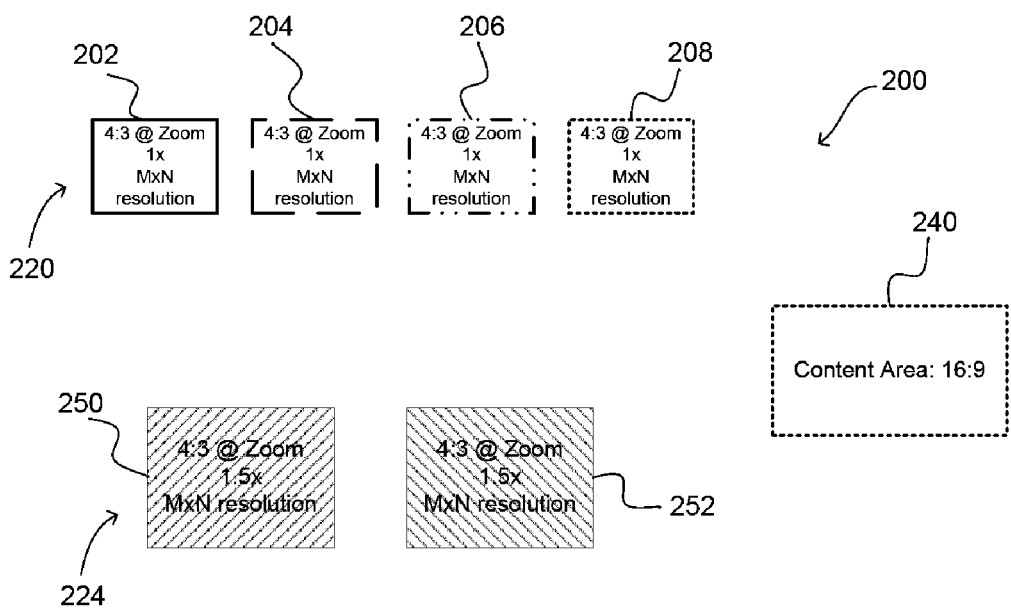
FIG. 3a is schematic of a system for projecting an image in accordance with one embodiment, comprising six separate 4:3 ratio projectors and a content area.

Referring now to FIG. 3*a*, a system 200 for projecting an image is illustrated according to one embodiment, the system including a plurality of projectors configured to each project a portion of an image and a defined content area 240 into which the portions of the image will be projected. The system includes a first group of projectors 220, shown as comprising four separate projectors 202-208, set at a first zoom level and a first aspect ratio and a second group of projectors 224, shown as comprising two separate projectors 250 and 252, set at a second zoom level and a second aspect ratio. Specifically, the first group of projectors 220 is designed to have four 4:3 ratio projectors set at a zoom level of 1×. The second group of projectors 224 is designed to have two 4:3 ratio projectors set at a 1.5× zoom level. All six projectors included in the first group of projectors 220 and the second group of projectors 224 is designed to have an M×N resolution. The content area is also designed to have a 16:9 aspect ratio within which the image will be projected. Other aspect ratios, resolutions, and zoom levels can be used for the projectors or the content area and the possible implementations are not meant to be limited in any way by the discussion of the present embodiment.

Figure 3B:
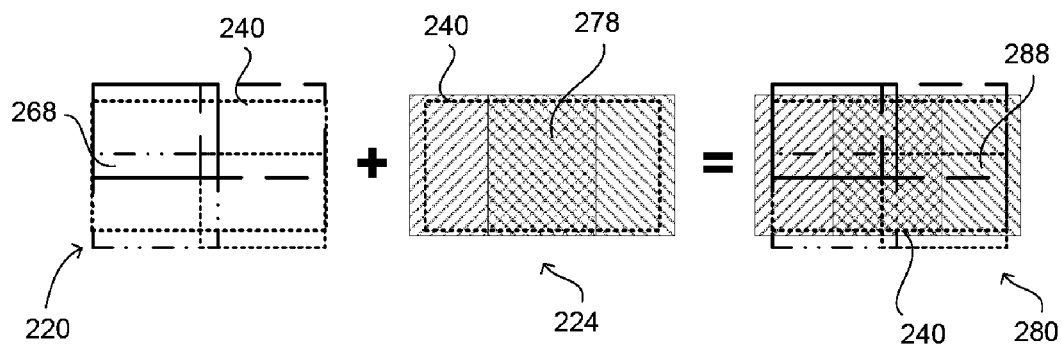
FIG. 3b is a schematic showing the six separate projectors of FIG. 3a being aligned and superpositioned in accordance with an embodiment to project an image within the content area.

FIG. 3*b* illustrates the system 200 for projecting images aligned and superpositioned relative to one another to display a composite image within the defined content area 240. The system is designed to work with software to divide an image into portions and to communicate the portions of the image to corresponding projectors, wherein the corresponding portions of the image projected in the content area merge and form a single image. Specifically, a projector 202 projects a first portion of an image, projector 204 projects a second portion of an image, projector 206 projects a third portion of an image, and projector 208 projects a fourth portion of an image such that the combination of the first, second, third, and fourth portions of an image merge and form the image within the content area 240.

FIG. 3b further illustrates the first group of projectors 220 is aligned and superpositioned such that a majority of the projector light is contained within the defined content area 240 and the projected image 264 from the system of projectors has a greater projected area, pixel resolution, and brightness than the projected image of any one projector within the system. The four projectors in the embodiment may be set at a zoom level and positioned so the perimeter of the combined images may be sized slightly larger than the defined content area 240. An overlap region 268 (shown as the area between the borders defining the projected images) is illustrated between the images projected by adjacent projectors. As previously presented, the first group of projectors 220 is designed to operate with a system for correcting an image comprising a camera (not shown) and software (not shown) to self align the projected images and create a single continuous and uninterrupted image within the defined content area 240.

Also illustrated are the second group of projectors 224, comprising projectors 250 and 252, aligned and superpositioned horizontally adjacent to each other to contain a majority of the projector light within the defined content area 240 and to provide a projected image from the system with a projected area, pixel resolution, and brightness greater than the projected image of any one projector within the system. The two projectors in the embodiment are set at a zoom level and horizontally positioned such that the perimeter of the combined image may be sized slightly larger than the defined content area 240. Further, FIG. 3b illustrates an overlap region 278 (shown as the area encompassed by the combination of cross hatchings) between the images projected by adjacent projectors.

Reference 280 illustrates the first group of projectors 220 superimposed with the second group of projectors 224 providing redundancy and forming a projected image within the defined content area 240, the image having a higher pixel resolution and brightness than any image projected by a any one projector within the system. A significant amount of overlap 288 (shown as the area enclosed by the defined content area 240) is illustrated between the superimposed images. The system for projecting an image 200 superimposed as in reference 280 permits a system of six less expensive 4:3 ratio projectors having M×N resolutions to project an image comparable to the image projected by more expensive projectors with resolutions significantly greater than M×N, while projecting the majority of the projector light within the defined 16:9 ratio content area 240. In addition, the system provides redundancy and thus ensures the projected image against a failure of any one of the separate projectors.

Figure 4A:
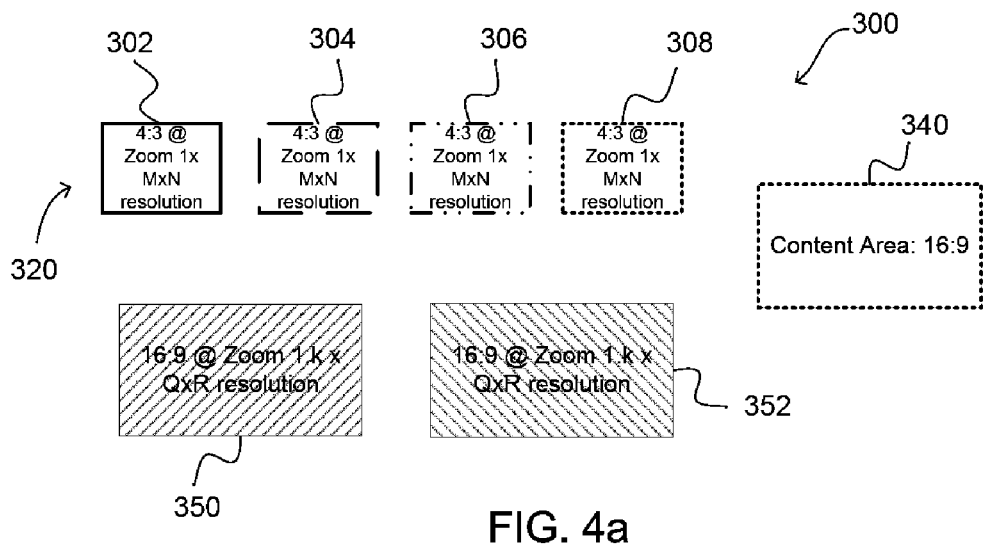
FIG. 4a depicts a system for projecting an image in accordance with another embodiment, comprising four separate 4:3 ratio projectors and two separate 16:9 ratio projectors and a content area.

Referring now to FIG. 4a, another embodiment of a system 300 is illustrated for projecting an image. The system can include a plurality of projectors configured to each project a portion of an image and a defined content area 340 into which the portions of the image will be projected. The system may include four M×N resolution projectors 302-308 comprising a first group of projectors 320, with each projector being set at a first zoom level of 1× and being designed to have a first aspect ratio of 4:3.

Figure 4B:
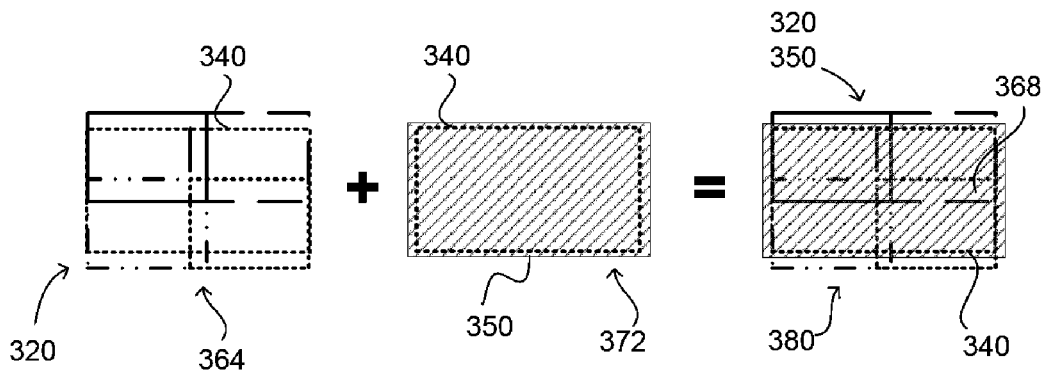
FIG. 4b is a schematic showing the four 4:3 ratio projectors and one 16:9 ratio projector of FIG. 4a being aligned and superimposed in accordance with one embodiment.

As shown in FIG. 4b and at reference 364, the first group of projectors 320 can be aligned and superpositioned and each projector can project a portion of an image such that the alignment and superpositioning of the projectors and the combination of the merged portions of an image form a single image within the defined content area 340. The system further includes a second Q×R resolution projector 350 and an additional Q×R resolution projector 352 set at a second zoom level of 1.k×, with the value of 1.k ranging fractionally between 1 and 2, and being designed to have a second aspect ratio of 16:9. The content area 340 is also designed to have a 16:9 aspect ratio into which the image will be projected. Other aspect ratios, resolutions, and zoom levels can be used for the projectors or the content area and the possible implementations are not meant to be limited in any way by the discussion of the present embodiment.

Figure 4C:
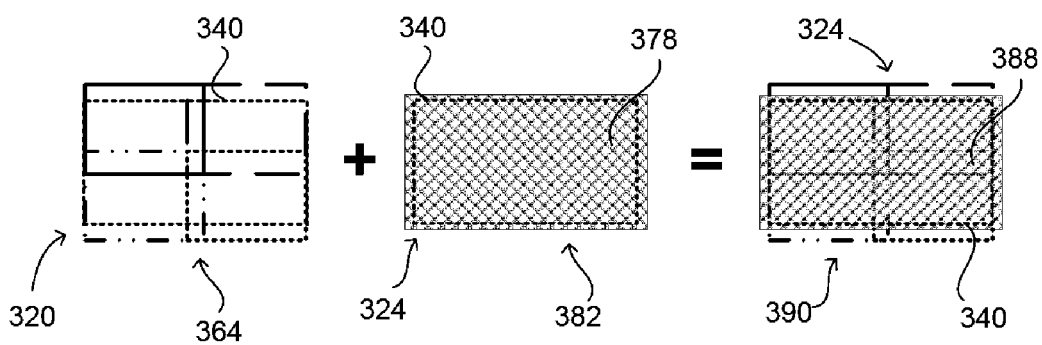
FIG. 4c is a schematic showing the four 4:3 ratio projectors and both 16:9 ratio projectors of FIG. 4a being aligned and superimposed in accordance with another embodiment.

FIG. 4b and 4c illustrate a system for projecting an image using projectors that are aligned and superpositioned to display an image within the defined content area 340. Reference 372 illustrates that the second projector 350 is zoomed and positioned such that the perimeter of the projected image is sized slightly larger than the defined content area 340 and such that a majority of the projector light is contained within the defined content area 340. Because the second projector 350 has the same 16:9 aspect ratio as the defined content area 340, the projected area of the second projector 350 may be zoomed and positioned to be substantially the same size as the defined content area 340 so that substantially the entire projector light is contained within the defined content area 340. Alternatively, a single 4:3 ratio projector or any ratio projector can be used and zoomed and positioned such that the projected area is larger than the defined content area 340. Reference 380 illustrates the first group of projectors 320 superimposed with the second projector 350 to form an image within the defined content area 340.

Alternatively, reference 382 in FIG. 4c illustrates that the second projector 350 can be aligned and superimposed (or slightly superpositioned horizontally adjacent) with an additional projector 352 to form a second group of projectors 324 that is a combination of 16:9 ratio projectors and that has a pixel resolution and brightness greater than the pixel resolution and brightness of any one projector of the group. The second group of projectors 324 can be zoomed and positioned so that the perimeter of the projected area is sized slightly larger than the defined content area 340. The reference further illustrates an overlap region 378 (shown as the area encompassed by the combination of cross hatchings) between the images projected by adjacent projectors that can be controlled in a manner similar to the manner previously presented. Reference 390 illustrates the first group of projectors 320 superimposed with the second group of projectors 324 to form an image within the defined content area 340.

References 380 and 390 (FIG. 4a and 4b) further illustrate a significant amount of overlap 368 and 388 (shown as the areas enclosed by the defined content area 340) between the superimposed images. The image in the overlapping regions can be controlled by using the software system and camera previously described.

Figure 5:
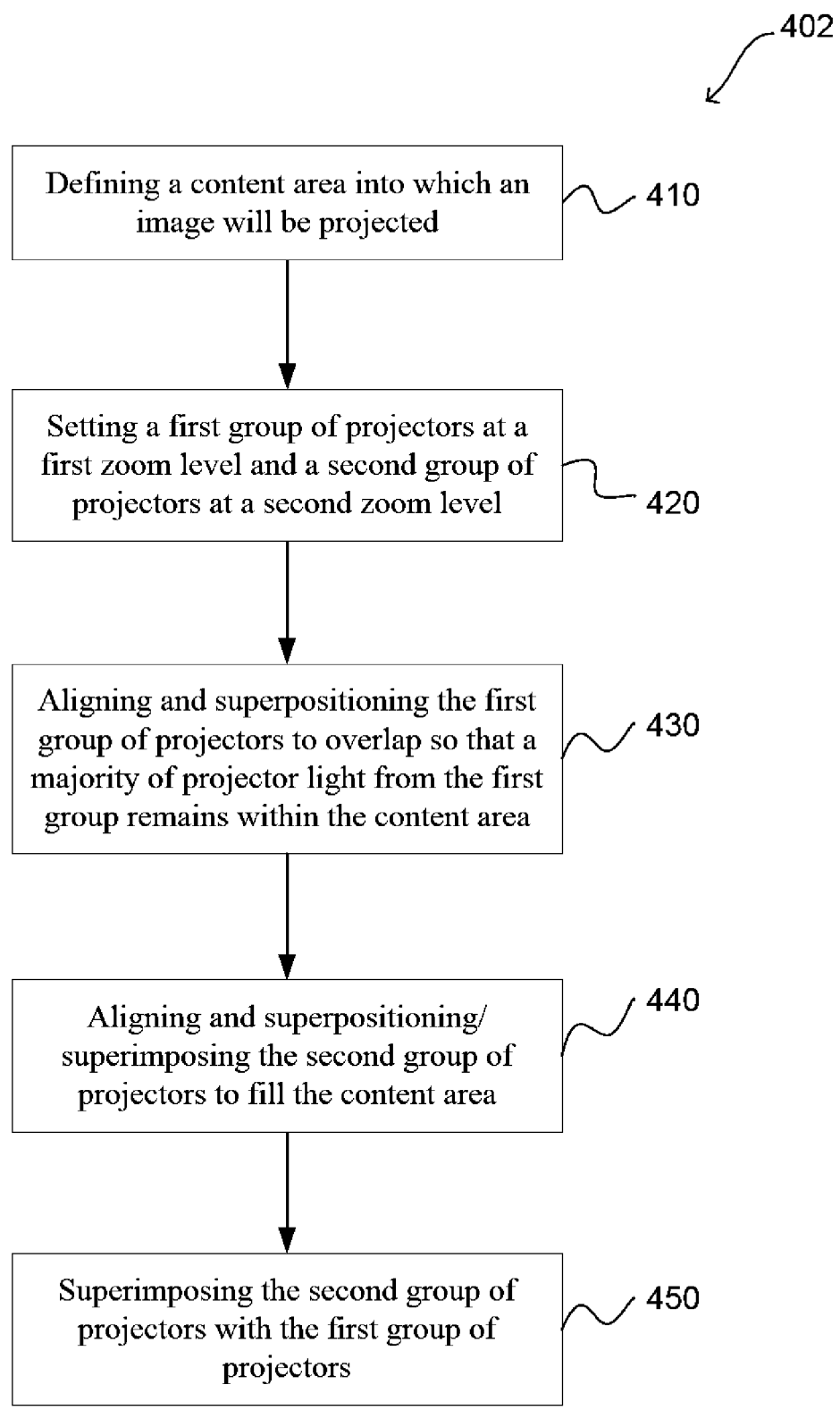
FIG. 5 is a flow chart illustrating a method of projecting an image using a plurality of projectors.

Referring now to FIG. 5, a flow chart illustrates a method of projecting an image using a plurality of projectors 402. The projectors are designed so that an image is divided and a portion of the image is projected by a corresponding projector of the plurality of projectors in a manner where the combination of the projected images forms the projected image. The plurality of projectors can be configured to project an image by defining a content area into which an image will be projected by the plurality of projectors 410. According to an embodiment, the content area can be sized to have an aspect ratio of 16:9. However, such an aspect ratio is not meant to be limiting in any way and many different aspect ratios could be used. A first group of projectors can then be selected from the plurality of projectors and the first group of projectors can be set at a first zoom level 420. The first group of projectors can also be selected so that each projector comprising the first group of projectors has the same aspect ratio and resolution. According to one embodiment, the first group of projectors can be selected to include four projectors having a 4:3 aspect ratio and set at a 1× zoom level. Additional projectors may be included and other aspect ratios and zoom levels may be selected. A second group of projectors may be selected from the plurality of projectors and set at a second zoom level 420. The second group of projectors can include a second projector or an additional projector in the group which can be selected to have the same or a different aspect ratio and resolution as the first group of projectors. Alternatively, the second projector may be selected from the plurality of projectors, set at a second zoom level 420, and used singly. The second projector may be selected to have substantially the same aspect ratio and resolution as the first group of projectors, or may be selected to have a different aspect ratio and resolution. According to one embodiment, the second projector and second group of projectors can have a 4:3 aspect ratio and can be set at a 1.5× zoom level. Similarly, other aspect ratios and zoom levels may be selected.

The first group of projectors can be aligned in a manner to permit the portions of an image from each projector to be superpositioned so that the portions of an image fit within the content area and so that the portions of an image projected from adjacent projectors overlap 430. The first group of projectors can be further aligned and superpositioned so that a majority of the projected light from the plurality of projectors fits within the content area 430.

The second projector can be aligned and zoomed so that the projected image from the second projector is sized slightly larger than the content area 440. The alignment and zoom level of the second projector can be set so that a majority of the light from the second projector fits within the content area 440. If the second projector is selected to have an aspect ratio (i.e. 16:9) substantially the same as the content area, the second projector can be aligned and zoomed so that the projected image is substantially the same size or slightly larger than the content area. Other aspect ratios can be used for the second projector and the content area of the projected image.

Alternatively, the second group of projectors can be aligned in a manner to permit the portions of an image to be superpositioned so that the portions of an image fit within the content area and so that the portions of an image from adjacent projectors overlap 440. In one embodiment, two projectors, such as the second projector and an additional projector, can be aligned and superpositioned horizontally adjacent each other so that the projected light from the plurality of projectors fills the content area and so that a majority of the projected light fits within the content area 440. In another embodiment, more than two projectors can be used whereby the projector light from the plurality of projectors fills the content area.

In still another embodiment, the projectors comprising the second group of projectors can be selected to have the same aspect ratio and can be zoomed and positioned so that the portions of an image projected from each projector is substantially the same size and shape. The projectors may then be aligned so that the images superimpose directly over each other thereby forming a single superimposed image. Furthermore, if the projectors are selected to have an aspect ratio (i.e. 16:9) substantially the same as the content area, the portions of an image projected from each projector can be superimposed directly over each other and zoomed so that the projected image is substantially the same size or slightly larger than the content area. Multiple aspect ratios can be used in the second group of projectors including 4:3 and 16:9 aspect ratios as one of ordinary skill in the art would recognize, and the discussion of the present embodiments is not meant to limit the invention in any way.

The first group of projectors can then be superimposed with the second projector whereby the image projected by the first group of projectors and the image projected by the second projector merge and form a single image within the content area and a majority of the projected light fits within the content area 450. Superimposing the image from the first group of projectors with the image from the second projector functions to increase the pixel resolution and brightness of a projected image and creates an image having a pixel resolution and brightness comparable to that of an expensive higher resolution projector. Superimposing the images also functions to provide redundancy ensuring the image against a failure of any one of the projectors. Alternatively, the first group of projectors can be superimposed with the second group of projectors whereby the image projected by the first group of projectors and the image projected by the second group of projectors merge and form a single image within the content area and whereby a majority of the projector light fits within the content area 450.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of projecting an image using a plurality of projectors being configured to each project a portion of the image, comprising:
    defining a content area into which the image will be projected by the plurality of projectors for display;
    setting a first group of the plurality of projectors at a first zoom level and a second group of the plurality of projectors at a second zoom level;
    aligning the first group of the plurality of projectors to be superpositioned with respect to one another and to overlap so that a majority of projector light from the first group remains within the content area;
    aligning the second group of the plurality of projectors to be superpositioned horizontally adjacent to each other to fill the content area; and
    superimposing the second group of the plurality of projectors with the first group of the plurality of projectors to increase the pixel resolution and brightness of the projected image.

2. A method as in claim 1, further comprising the step of using the first group of projectors at the first zoom level with a 1× zoom level and the second group of projectors at the second zoom level with a zoom level between 1× and 2×.

3. A method as in claim 1, further comprising the step of using the first group of projectors at the first zoom level with a 1× zoom level and the second group of projectors at the second zoom level with a 1.5× zoom level.

4. A method as in claim 1, further comprising the step of using the first group of projectors having a first aspect ratio and the second group of projectors having a second aspect ratio.

5. A method as in claim 1, further comprising the step of using the first group of projectors and the second group of projectors having the same resolution.

6. A method as in claim 1, further comprising the step of using the first group of projectors and the second group of projectors having a 4×3 ratio projection.

7. A method as in claim 1, wherein the step of defining the content area to be displayed further comprises the step of defining a 16×9 ratio area.

8. A method as in claim 1, further comprising the step of using the first group of projectors that includes at least four projectors and using the second group of projectors that includes at least two projectors.

9. A method of projecting an image using a plurality of projectors being configured to each project a portion of the image, comprising:
   defining a content area into which an image will be projected by the plurality of projectors for display;
   setting a first group of the plurality of projectors at a first zoom level and a second projector of the plurality of projectors at a second zoom level;
   aligning the first group of the plurality of projectors to be superpositioned with respect to one another and to overlap so that a majority of projector light from the first group remains within the content area;
   positioning the second projector so that the projector light from the second projector is sized at least as large as the content area; and
   superimposing the second projector with the first group of the plurality of projectors to fill the content area and increase the pixel resolution and brightness of the projected image.

10. A method as in claim 9, further comprising:
    setting an additional projector of the plurality of projectors at a second zoom level;
    aligning the second projector and the additional projector to be superimposed directly over each other, wherein the second projector and the additional projector form a second group of projectors; and
    superimposing the second group of projectors with the first group of the plurality of projectors to fill the content area and increase the brightness of the projected image.

11. A method as in claim 9, further comprising the step of setting the first group of the plurality of projectors at the first zoom level with a 1× zoom level and the second projector at the second zoom level with a zoom level between 1× and 2×.

12. A method as in claim 10, further comprising the step of setting the first group of the plurality of projectors at the first zoom level with a 1× zoom level and the second group of projectors at the second zoom level with a zoom level between 1× and 2×.

13. A method as in claim 9, further comprising the step of using the first group of the plurality of projectors having a first aspect ratio and the second projector having a second aspect ratio.

14. A method as in claim 10, further comprising the step of using the first group of the plurality of projectors having a first aspect ratio and the second group of projectors having a second aspect ratio.

15. A method as in claim 9, wherein the step of defining the content area to be displayed further comprises a step of defining a 16×9 ratio area.

* * * * *